E. M. ARNOLD.
LUGGAGE CARRIER FOR MOTOR VEHICLES.
APPLICATION FILED FEB. 14, 1921.
1,408,965.
Patented Mar. 7, 1922.
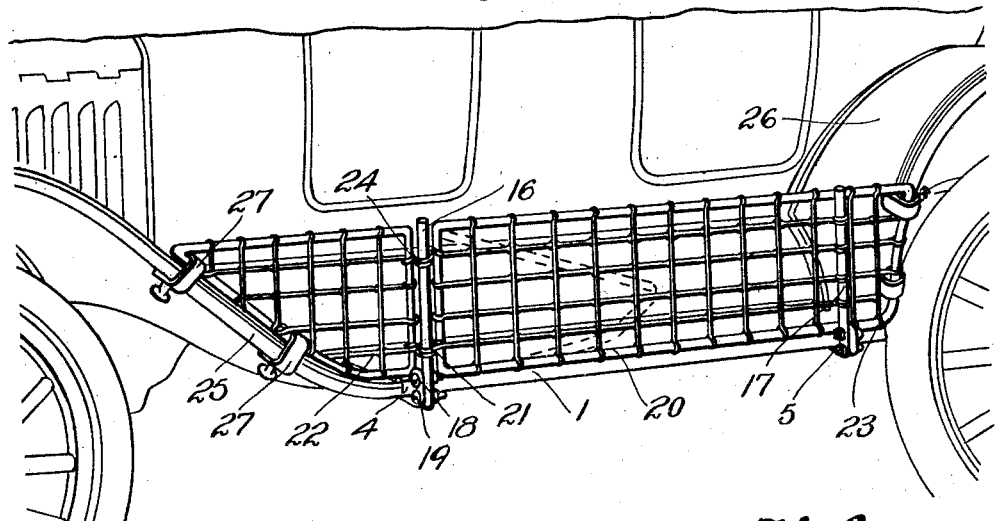
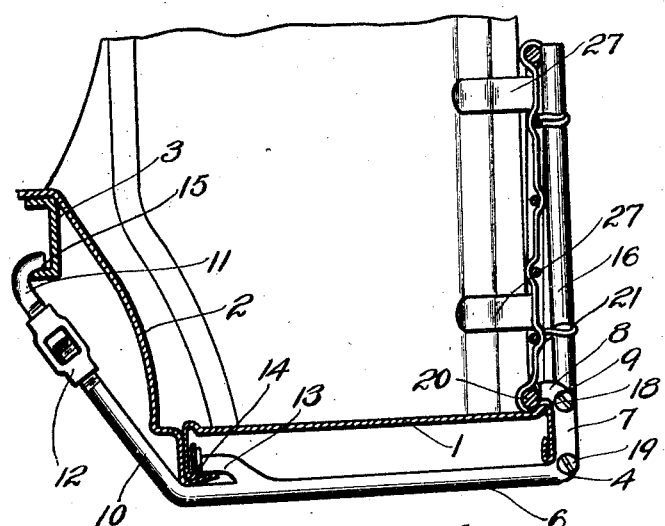
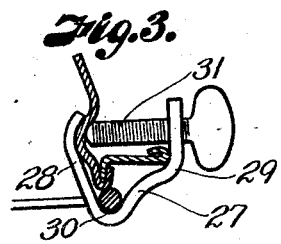
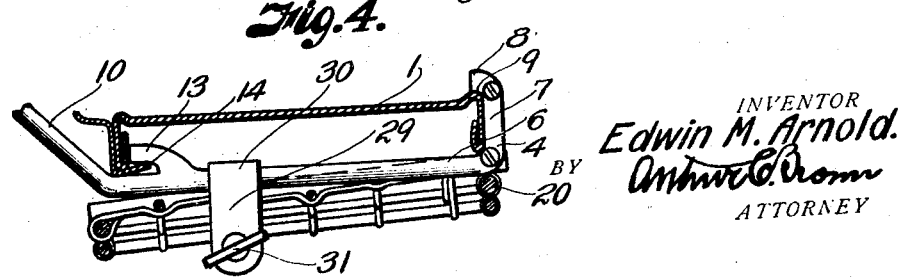
INVENTOR
Edwin M. Arnold.
BY
ATTORNEY

UNITED STATES PATENT OFFICE.

EDWIN M. ARNOLD, OF TULSA, OKLAHOMA.

LUGGAGE CARRIER FOR MOTOR VEHICLES.

1,408,965.  Specification of Letters Patent.  Patented Mar. 7, 1922.

Application filed February 14, 1921. Serial No. 444,974.

*To all whom it may concern:*

Be it known that I, EDWIN M. ARNOLD, a citizen of the United States, residing at Tulsa, in the county of Tulsa and State of Oklahoma, have invented certain new and useful Improvements in Luggage Carriers for Motor Vehicles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to luggage carriers, particularly applicable for use in connection with motor vehicles.

The invention is designed to be applied to the running board of a motor vehicle when in use and when not in use, it is capable of being stored under the running board to be available when desired.

The primary object of the invention is to provide a simple construction of luggage carrier which may be readily applied and as easily detached from the running board and without changing the construction of the running board of the vehicle.

In the drawings,

Fig. 1 is a fragmentary perspective view of a motor vehicle to which my invention is applied.

Fig. 2 is a cross sectional view through the running board and the luggage carrier, the brackets being shown in elevation.

Fig. 3 is an end view of one of the clips attached to a mud guard, the mud guard being shown in section, and Fig. 4 is an end view of the luggage carrier in its collapsed position, supported beneath the running board.

The running board 1 of the motor vehicle is attached to the chassis in any well known manner, there being an apron 2 of usual construction between it and the channel 3, which constitutes the longitudinal or side sills.

There are luggage carrier brackets supported by the motor vehicle which, in turn, support the walls of the luggage carrier. The brackets, as illustrated, are two in number, designated 4 and 5. Each consists of a horizontal bar 6, having at one end an upstanding, hook-shaped extension 7, the terminal 8 of which laps over the bead 9 of the running board 1. At the other end of the bar is an inwardly and upwardly extending arm 10 at an obtuse angle to the bar 6 and having a hook-shaped end 11, adjustably connected to the arm 10 by a turnbuckle 12 so that when the hook-shaped portion 7 of the bar 6 engages the bead 9 and the intermediate upwardly and inwardly extending finger 13 engages the flange 14 which connects the inner edge of the running board to the apron 2, the bracket may be fastened securely by turning the turnbuckle 12 so that the hook-shaped portion 11 firmly engages the inwardly projecting flange 15 of the channel 3. The hook-shaped portion 7 of each of the brackets is adapted to support a vertical post or standard, there being two shown and designated 16 and 17. These standards or posts are fastened to the flat, upstanding end 7 by bolts 18 and 19 in each instance and the posts constitute supports for the hinged carrier sections or walls, shown as consisting of an intermediate fence frame or wall 20, substantially rectangular and fastened to the posts by loops 21, through which the posts project. The ends 22 and 23 are also provided with loops designated 24, which engage the respective posts 16 and 17 so that they may have swinging movement thereon. The ends of the swinging sections 22 and 23 conform to the mud guards 25 and 26 and they are fastened to the mud guards by substantially U-shaped clips 27, one of which is shown in Fig. 3 as consisting of substantially parallel arms 28 and 29, connected by a crimped or grooved portion 30 to engage the frame of the section 22 or 23, there being an adjustable winged bolt or set screw 31 to impinge against the mud guard so that the mud guard and end section will be fastened together, as shown in Fig. 1.

Under ordinary circumstances, the brackets 4 and 5 will remain connected to the chassis frame and running board in the manner shown in Fig. 2. The turnbuckle 12 provides for any looseness or slack which may be taken up by turning the turnbuckle. The end sections 22 and 23 will be folded upon the center section 20. As these comprise the wall luggage carrier, it will be seen that they may be detached from the brackets by removing the bolts 18 and 19. The posts and the wall sections may, therefore, be stored under the running board by securing them to the brackets by the clips 27, as shown in Fig. 4.

When the wall sections are stored under the running board, the crimped or grooved portion 30 will engage the upper edge of the bar 6 and the set screw 31 will be in a horizontal position as shown.

When it is desired to apply the luggage carrier, the clips 27 will be released from the position shown in Fig. 4 and the posts or standards 16 and 17 will be fastened to the portions 8, as shown in Figs. 1 and 2. The ends of the end sections 22 and 23 will then be fastened to the mud guards as shown in Fig. 1. After use, the center and end sections may be detached as heretofore described.

It will be seen that an efficient form of luggage carrier may be provided which is capable of being attached to existing types of motor vehicles without marring the motor vehicle or changing its construction.

What I claim and desire to secure by Letters-Patent is:

1. A luggage carrier for motor vehicles comprising brackets consisting of bars having hooked ends, one hooked end of each bar being adjustable with respect to the bar which supports it, another hook carried by each bar and located between the ends thereof, and a vertical wall connected to the respective bars.

2. A luggage carrier for motor vehicles comprising brackets consisting of horizontal bars, each of which is provided with a running-board-engaging hook and a chassis frame-engaging hook, an intermediate hooked finger on the bar of each bracket for engagement with a part of the motor vehicle between the ends of the bracket, and a vertical wall hinged to said brackets and foldable beneath the same.

3. A luggage carrier for motor vehicles comprising brackets consisting of horizontal bars, each of which is provided with a running-board engaging hook and a chassis frame-engaging hook, an intermediate finger on the bar of each bracket for engagement with a part of the motor vehicle between the ends of the bracket, and a vertical wall secured to said brackets.

4. A luggage carrier for motor vehicles comprising bars, means on the bars for engaging the under side of a running board and a motor vehicle frame, hinged vertical wall members carried by the bracket bars, and clips for securing the ends of the vertical wall members to the mud guards of the vehicle when the wall members are extended and for securing the wall members to the bracket bars beneath the running board when they are collapsed.

In testimony whereof I affix my signature.

EDWIN M. ARNOLD.